Oct. 15, 1963   G. R. DEMPSTER ETAL   3,107,020
VEHICLE BODY LOADING AND UNLOADING MECHANISM
Filed March 18, 1959   9 Sheets-Sheet 1
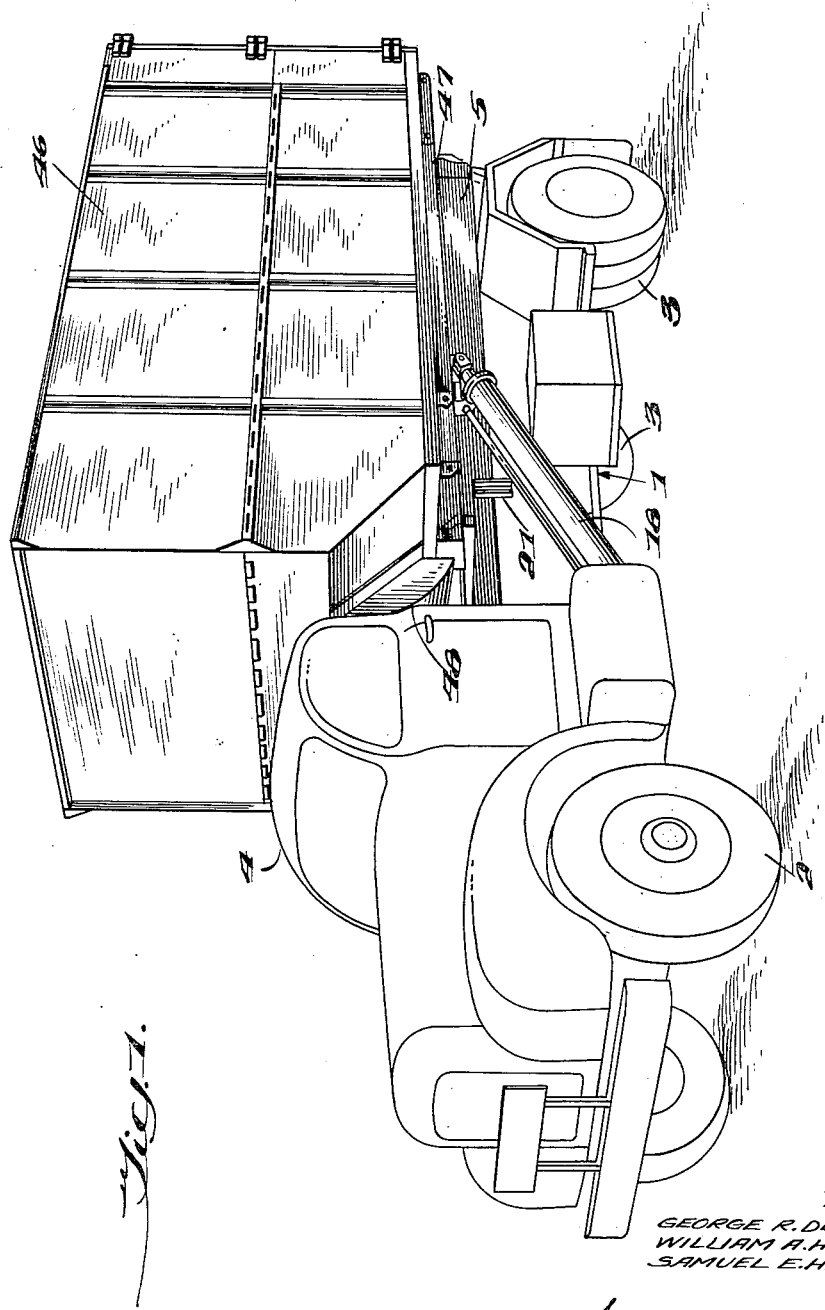
INVENTORS
GEORGE R. DEMPSTER,
WILLIAM A. HERPICH,
SAMUEL E. HARVEY,
BY
ATTORNEYS

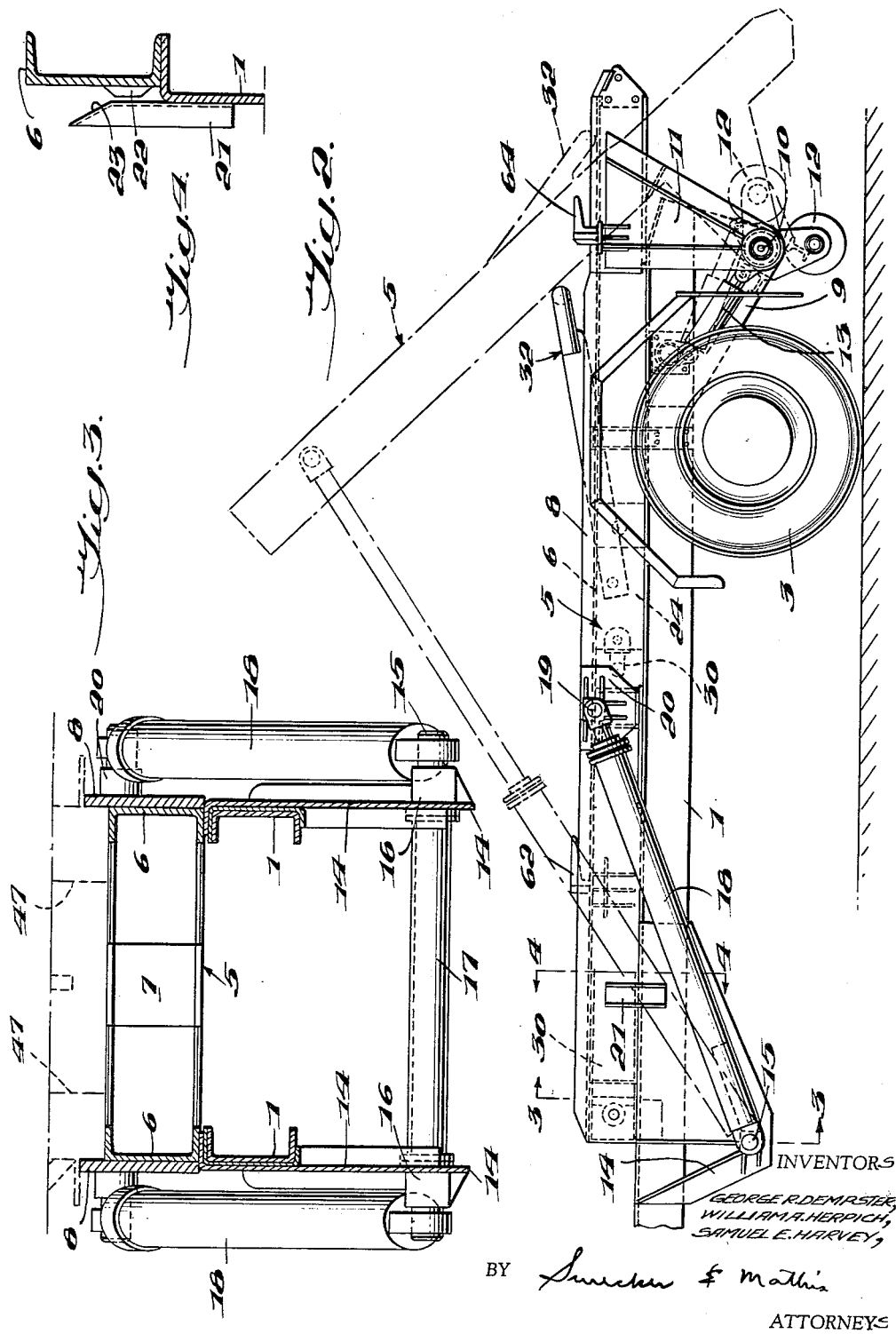

Fig. 5.

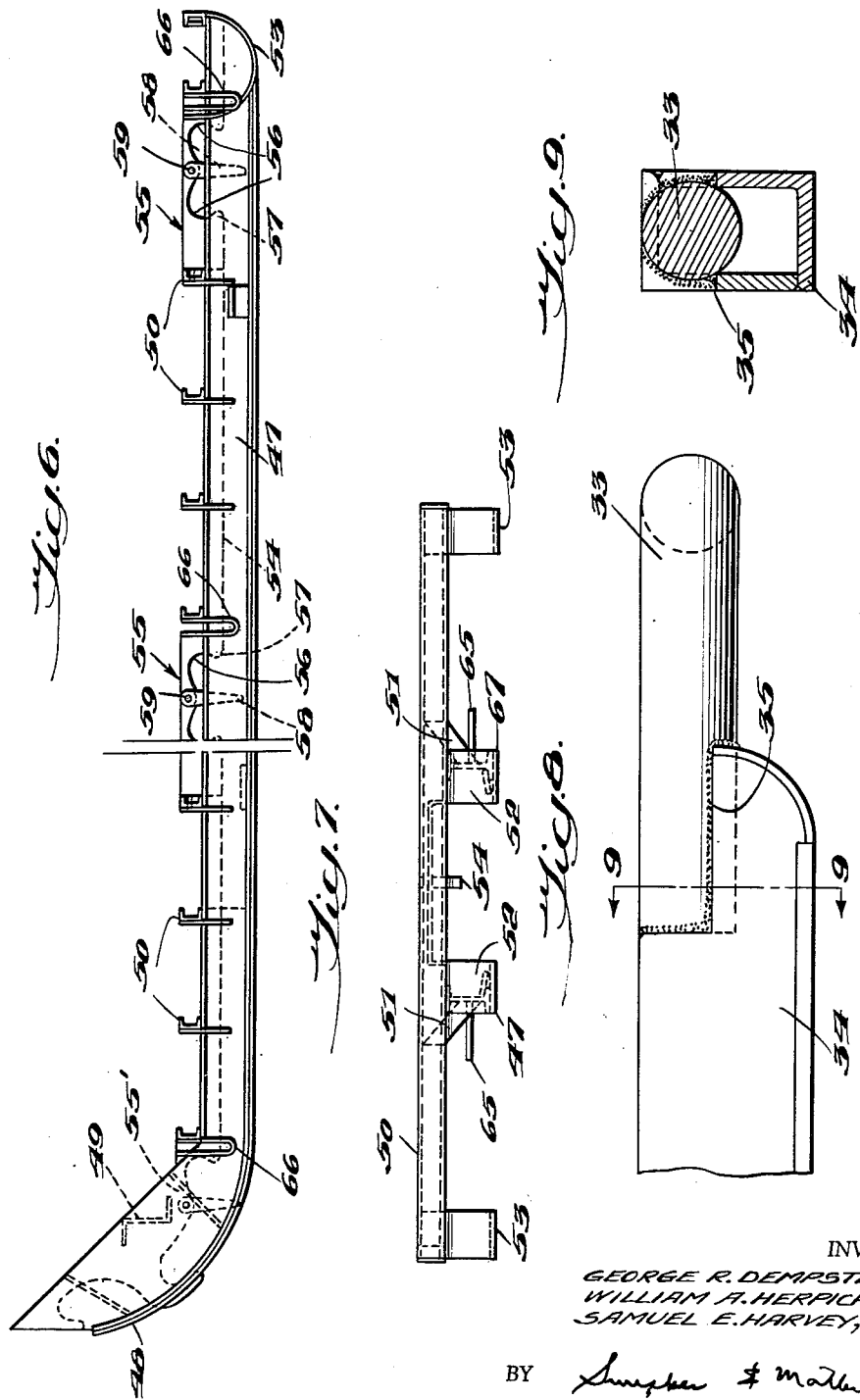

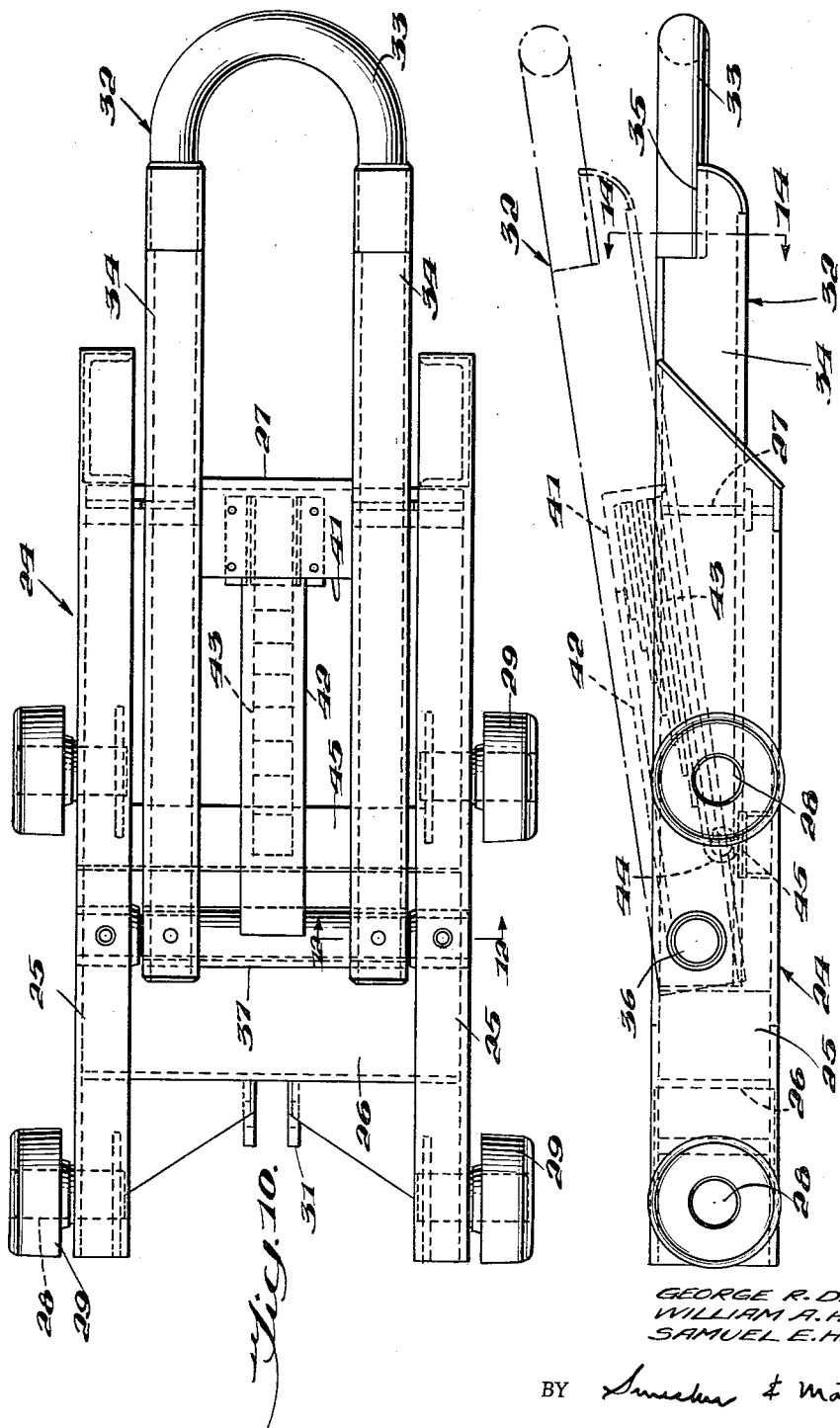

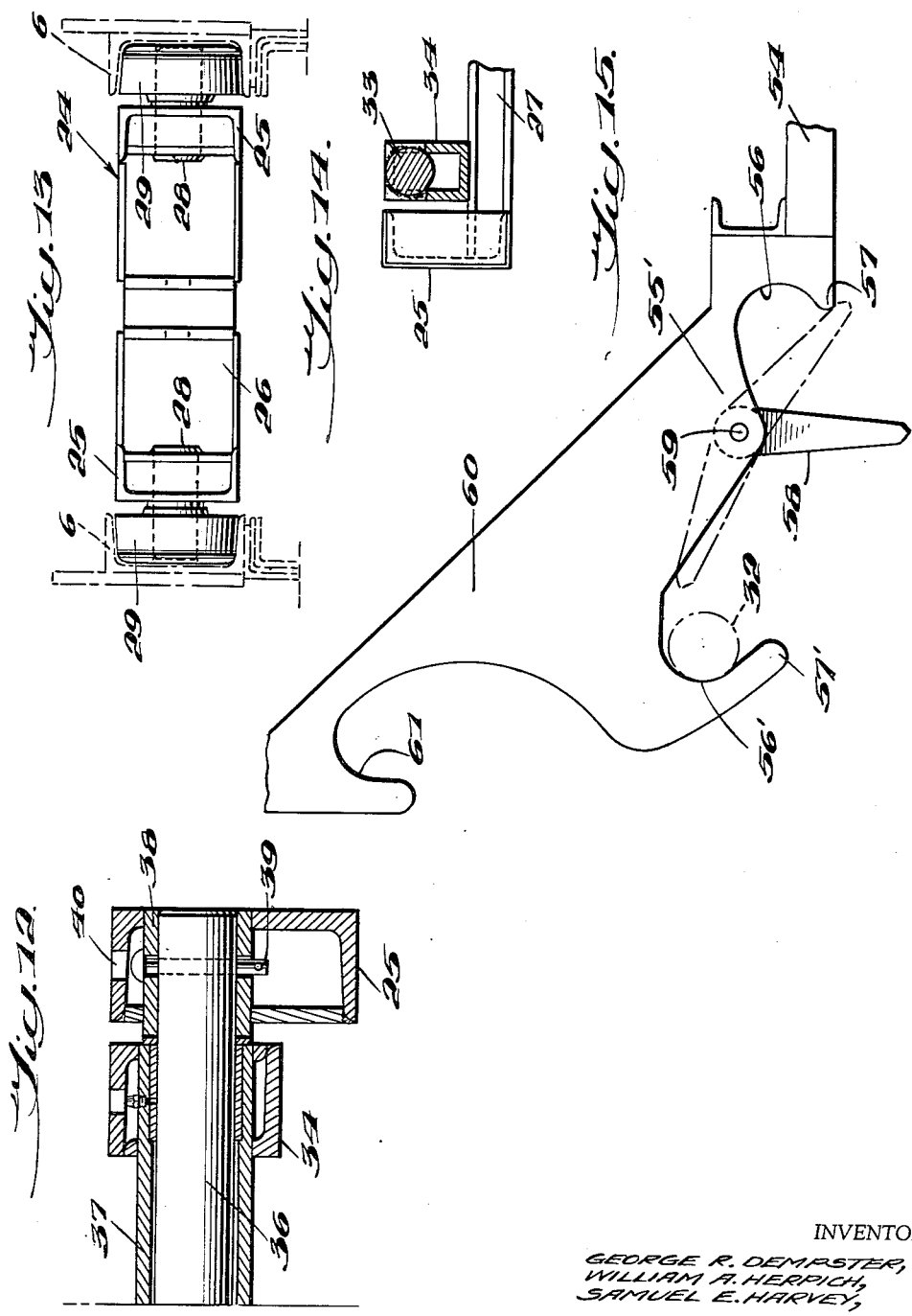

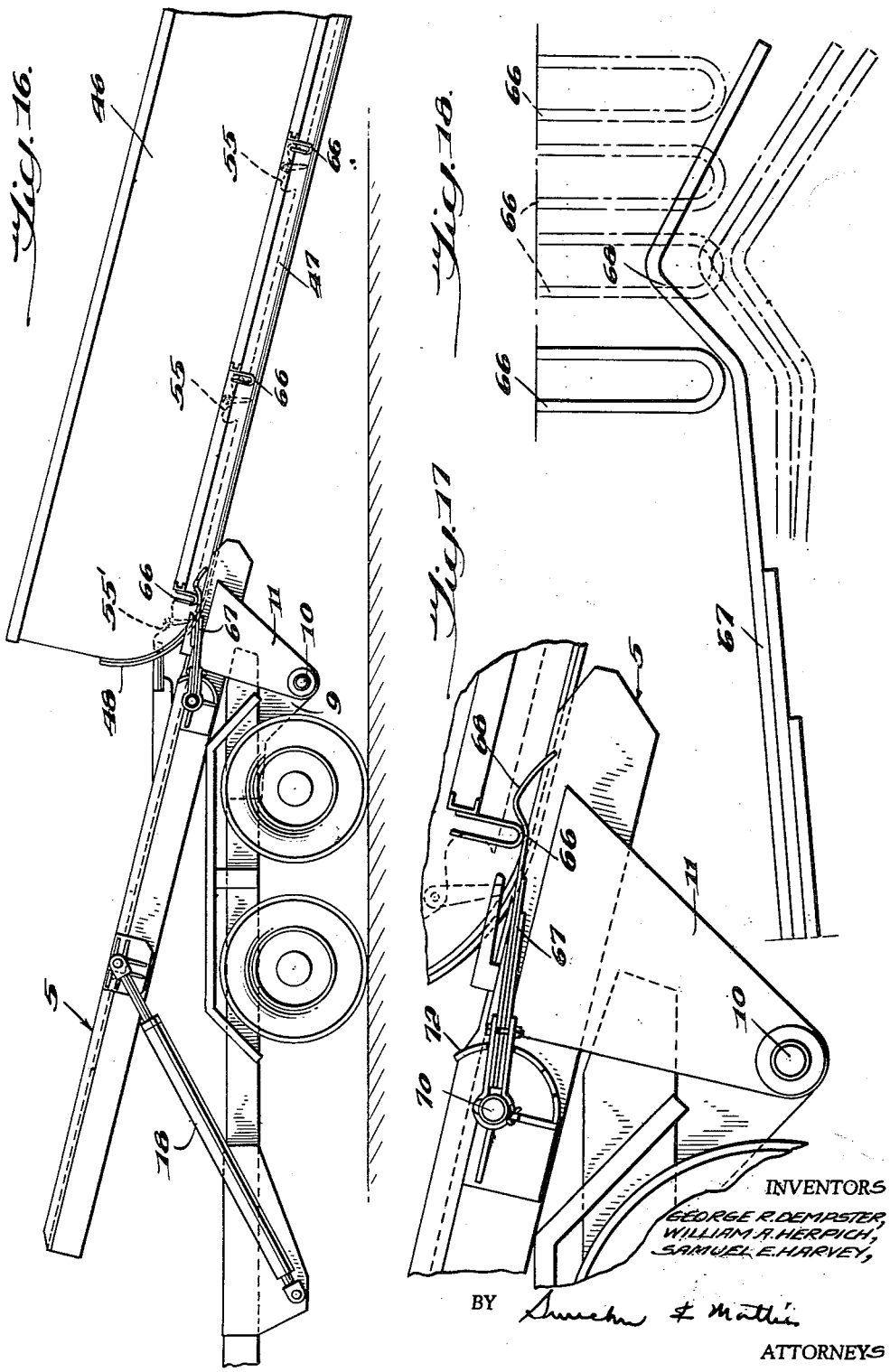

Oct. 15, 1963   G. R. DEMPSTER ETAL   3,107,020
VEHICLE BODY LOADING AND UNLOADING MECHANISM
Filed March 18, 1959   9 Sheets-Sheet 8
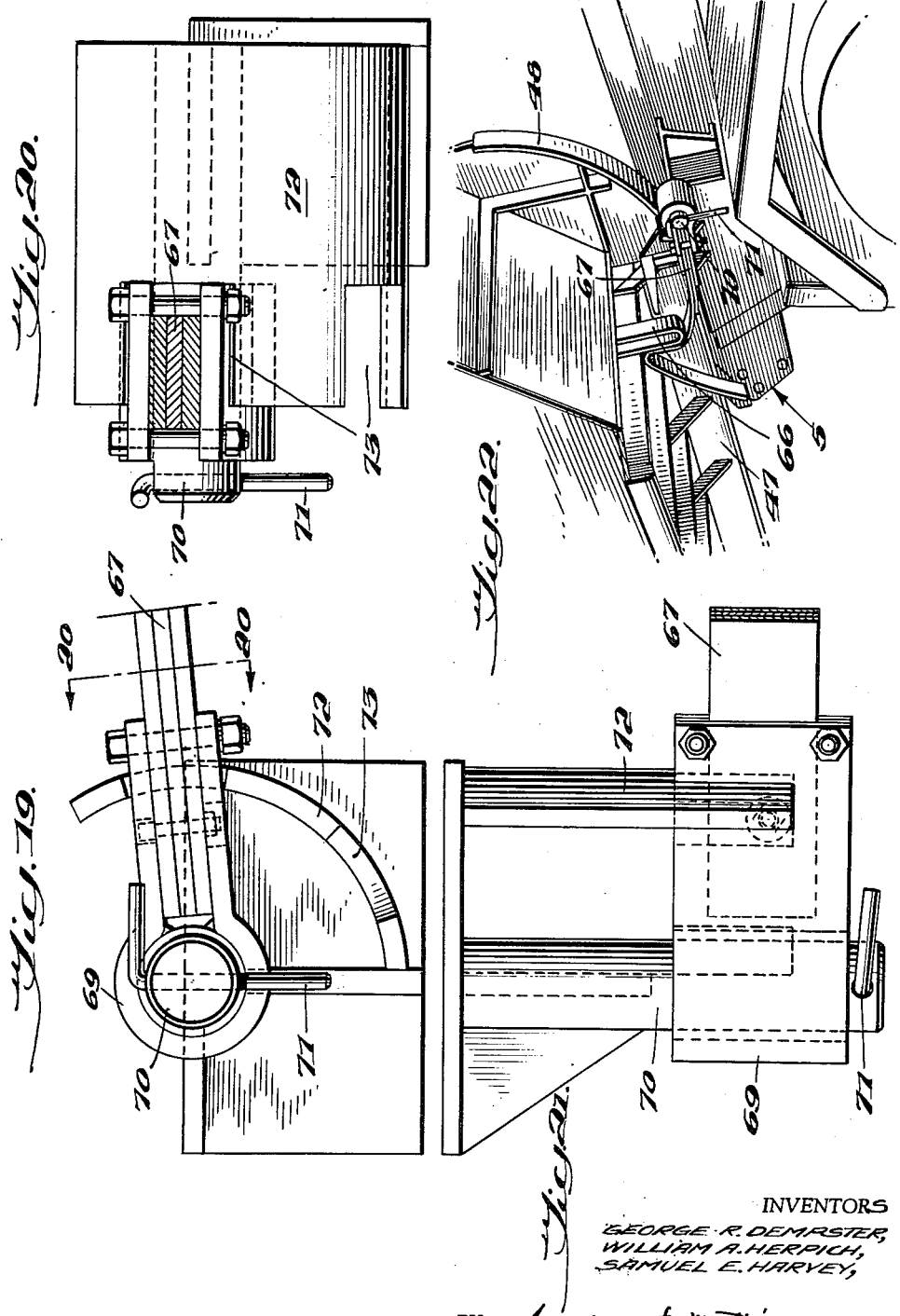
INVENTORS
GEORGE R. DEMPSTER,
WILLIAM A. HERPICH,
SAMUEL E. HARVEY,
BY
ATTORNEYS Oct. 15, 1963        G. R. DEMPSTER ETAL        3,107,020
VEHICLE BODY LOADING AND UNLOADING MECHANISM
Filed March 18, 1959                            9 Sheets-Sheet 9
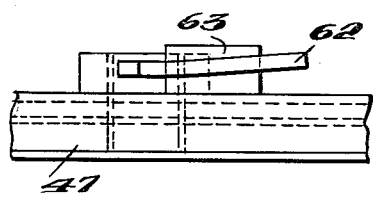
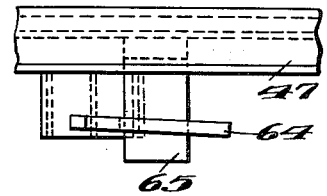
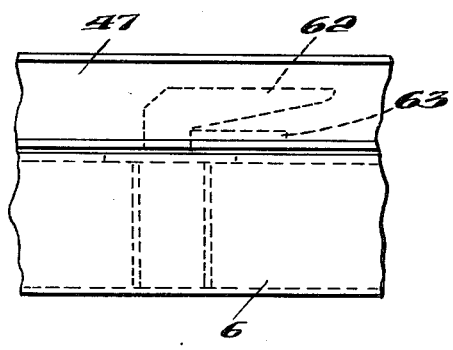
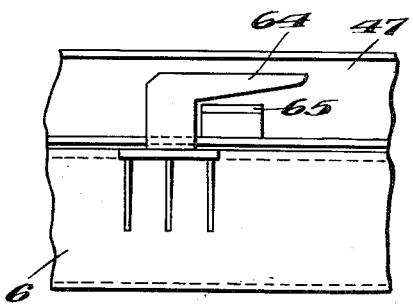
INVENTORS
GEORGE R. DEMPSTER,
WILLIAM A. HERPICH,
SAMUEL E. HARVEY,
BY
ATTORNEYS United States Patent Office 3,107,020
Patented Oct. 15, 1963

3,107,020
VEHICLE BODY LOADING AND UNLOADING
MECHANISM
George R. Dempster, William A. Herpich, and Samuel E.
Harvey, Knoxville, Tenn.; said Herpich and said
Harvey assignors to Dempster Brothers, Inc., Knoxville, Tenn., a corporation of Tennessee
Filed Mar. 18, 1959, Ser. No. 800,320
8 Claims. (Cl. 214—505)

This application is a continuation-in-part of our prior application for Transporting Equipment for Containers, Serial No. 744,107, filed June 24, 1958, now abandoned.

This invention relates to improvements in vehicle body loading and unloading mechanism for picking up large containers of the order of vehicle bodies and for loading and unloading such containers with respect to a transport vehicle, separable therefrom.

It is often desirable to use large capacity containers for holding various types of lading and to provide for the loading and unloading of such containers with respect to a transporting vehicle. Such containers can be filled when sitting on the ground, floor or other surface, after which they can be picked up or loaded by power, transported to a remote point, and then set down or unloaded. It is also possible to load the body separate and apart from the motor vehicle and then transport the loaded body to a remote point and disconnect it from the vehicle while still loaded.

Most transporting devices, which have provided for the loading of a body after filling, have used cable mechanism to load and unload the body with respect to the vehicle. We have set forth in the above-mentioned application mechanism which will accomplish this operation by power means functioning without the use of cables and which instead responds to hydraulic power devices to provide for the operation of the mechanism.

One object of this invention is to improve the construction of the equipment for handling a detachable body or container for loading or unloading the same on a vehicle chassis.

Another object of the invention is to provide for better control of the separate body or container during the picking up and discharge actions, to prevent the possibility of the body getting loose from the vehicle and falling prematurely.

Still another object of the invention is to simplify and improve the mechanism for picking up and discharging the separable body or container, to insure of proper and smooth operation thereof, and automatic pick-up, all under the control of the operator and without requiring manual action at the point by an attendant.

These objects may be accomplished, according to one embodiment of the invention, by constructing a body or detachable container, with means on the body thereof which may be engaged selectively and successively for moving the container step-by-step in its progress onto and off the transport vehicle. Thus, the supporting structure of the separable body or container may be provided with a series of hook stations spaced at intervals along the length thereof in positions for successive engagement by a bail mechanism mounted on the subframe of the vehicle and reciprocated hydraulically for moving the separable body or container step-by-step onto and off the vehicle. The supporting frame structure of the separable body or container is constructed either as an integral part of the container or body or for mounting of the body portion of the container thereon. Thus, it may be practical to provide the users of the equipment with supporting frame structures for bodies on which they may construct the body portions, thus effecting a material saving in the cost of transporting the bodies or containers from manufacturer to user.

The vehicle chassis is constructed with a tilting frame mounted thereon so as to provide for raising and lowering tilting movements of the frame. The bail used for connection with the separable body or container preferably is mounted on a carriage which has guiding movement with respect to the tilting frame, so as to permit of proper reciprocating movement of the bail lengthwise with respect to the separable body or container. Thus, the bail may be moved successively into engagement with hook stations provided on the separable body or container, and acting thereon step-by-step causes movement of the separable body or container onto or off the tilting frame of the vehicle. This step-by-step movement is accomplished by a hydraulic power device connected therewith to effect reciprocating action of the carriage.

The tilting frame may be provided, if desired, with a stabilizing jack to engage the ground or other support surface when the frame is tilted during loading or unloading of the separable body or container. This is desirable especially when handling heavy loads, although it is not required for relatively light loads.

Provision is made also for preventing accidental separation or disconnection of the body from the tilting frame or vehicle chassis, especially when the end of the body is only slightly overlapped therewith. For example, when the forward end of the body or container engages the rear end of the tilting frame, the operation of the bail mechanism may be sufficient to disconnect the body from the tilting frame. We have provided a container arrester mechanism which will prevent such accidental separation and will insure of complete and effective engagement of the body or container with the tilting frame.

This embodiment of the invention is illustrated in the accompanying drawings, in which:

FIG. 1 is a perspective view showing a vehicle chassis having the invention applied thereto and with a separable body or container thereon;

FIG. 2 is a side elevation of a portion of the vehicle chassis and tilting frame, with the body or container separated therefrom;

FIG. 3 is a detail cross section therethrough on the line 3—3 in FIG. 2;

FIG. 4 is a similar view on the line 4—4 in FIG. 2;

FIG. 5 is a top plan view of the supporting frame structure of a container;

FIG. 6 is a side elevation thereof;

FIG. 7 is a rear elevation thereof;

FIG. 8 is a detail side elevation of a portion of the bail structure;

FIG. 9 is a cross section therethrough on the line 9—9 in FIG. 8;

FIG. 10 is a top plan view of the bail structure and carriage;

FIG. 11 is a side elevation thereof;

FIG. 12 is a detail cross section therethrough on the line 12—12 in FIG. 10;

FIG. 13 is a front elevation of the carriage for the bail;

FIG. 14 is a detail cross section on the line 14—14 in FIG. 11.

FIG. 15 is a detail side elevation of the front hook station and safety hook of the body subframe;

FIG. 16 is a side elevation, showing the tilting frame and body in loading position;

FIG. 17 is a side elevation, showing the container arrester mechanism;

FIG. 18 is a diagrammatic view, showing the action of the arrester mechanism;

FIG. 19 is a detail side elevation of the mounting of the arrester spring;

FIG. 20 is a cross section therethrough on the line 20—20 in FIG. 19;

FIG. 21 is a top plan view thereof;

FIG. 22 is a perspective view of the arrester mechanism for holding the container;

FIG. 23 is a top plan view of the front locking wedge and stop bar;

FIG. 24 is a side elevation of portions of the tilting frame and showing the front locking wedge and stop bar;

FIG. 25 is a top plan view, showing the rear stop bar; and

FIG. 26 is a side elevation thereof.

The invention is illustrated as applied to a motor vehicle chassis of conventional form, wherein the chassis frame is indicated generally at 1, supported by front and rear wheels 2 and 3. The vehicle is power driven in the usual manner under control of an operator located within a cab 4.

The chassis frame should be of sufficient length to receive thereon and to accommodate the separable vehicle body or container. It may also, if desired, be a supporting frame of a conventional trailer, separate from the tractor portion of the vehicle, although functioning otherwise in the same manner as described.

Mounted on the chassis frame 1 is a tilting frame, generally indicated at 5, in such position as to be disposed directly over the chassis frame 1, as will be apparent from FIG. 3. The tilting frame 5 extends lengthwise of the chassis frame 1 and includes a pair of longitudinal channel members 6 on opposite sides of the tilting frame in vertical alignment with the sides of the chassis frame 1. The channels 6 are suitably braced and spaced apart by intermediate connecting members 7 which cooperate to form a unitary frame. On the outer faces of the channel members 6 are upstanding side plates 8 adapted to form opposite side members of a guideway for slidably receiving the subframe of the body or container therebetween, which container slides upon the upper faces of the guide channels 6. These plates 8 may be welded or otherwise secured rigidly to the longitudinal channels 6 of the tilting frame.

At the rear end of the chassis frame 1, at each lateral side thereof, is a depending bracket 9. Supported upon the brackets 9 is a pivot shaft 10 upon which brackets 11 are pivotally supported. The brackets 11 are connected rigidly with the rear end portion of the tilting frame 5. Thus, the tilting frame 5 is pivotally mounted on the chassis 1 for swinging movement relative thereto, as illustrated in full lines and dotted lines in FIG. 2.

The rear end portion of the tilting frame 5 may be provided with a stabilizing jack, if desired or needed, especially for abnormally heavy loads. One form of stabilizing jack, which is claimed in a companion application, is shown in FIG. 2 as including a roller 12 mounted eccentrically with respect to the pivot shaft 10 for raising and lowering movements with respect thereto under control of a power device 13. This power device may be of the usual type, operated pneumatically or hydraulically, having a power cylinder and piston connected therewith for shifting the roller 12 into and out of operative positions. The upper end of the power device 13 is suspended from the chassis frame 1. One or more such power devices may be used, as desired, as, for example, one on each side of the tilting frame.

At the forward end portion of the tilting frame 5, the chassis frame 1 is provided with depending brackets 14, welded or otherwise secured rigidly to the members of the chassis frame, as shown in FIGS. 2 and 3. The bracket members 14 mount a cross shaft 15 which is journaled in boxing 16, secured to the outer sides of the plate-like bracket members 14. The shaft 15 extends through a spacer member 17, interposed between the inner faces of the plate-like bracket members 14 to hold the latter suitably braced and in rigid relation.

Mounted on the outer projecting ends of the shaft 15 are the lower ends of hydraulic power devices or cylinders 18, the upper ends of which are pivotally connected at 19 with bracket members 20 secured to opposite sides of the tilting frame. The hydraulic power devices 18 are of any suitable or desired form, with a cylinder and piston assembly for each, capable of telescopic movement in raising and lowering the tilting frame 5 relative to the chassis frame 1. As an example, the tilting frame 5 is capable of raising and lowering movements between the full line and dotted line positions illustrated in FIG. 2.

The lowering movement of the tilting frame 5 may be confined by upright guide members 21 (see FIG. 4) secured at their lower ends to the lateral sides of the chassis frame 1 and projecting above the latter. The channel members 6 of the tilting frame 5 are spaced inward somewhat from the outer faces of the chassis frame 1 in the illustrated embodiment. These channel members 6 may be provided, if desired, with wedge blocks 22 on the outer faces thereof, of suitable or desired thicknesses for directing the forward end portion of the tilting frame 5 into a seated position between the upstanding guide members 21. The latter may be bevelled at their upper ends, as illustrated at 23, to aid in guiding the tilting frame 5 in seated position upon the chassis frame 1.

The channel members 6 of the tilting frame 5 form opposed trackways receiving therebetween a carriage 24 (see FIGS. 10 to 13). The carriage 24 includes a pair of longitudinal side members 25 spaced apart and located in relatively close relation to the inner faces of the channel members 6. These longitudinal supporting members 25 are suitably held in spaced relation and braced by intermediate connections, generally indicated at 26 and 27 in FIG. 10.

Mounted on the respective support members 25 and extending laterally in opposite directions therefrom at longitudinally spaced points are suitable axles 28. Mounting members are supported on the axles 28, as indicated at 29. These mounting members may be in the form of rollers, if desired, although slides or other suitable means may be substituted therefor. These form bearing supports within the channels 6 for guiding the carriage 24 lengthwise of the tilting frame in reciprocating movements.

Such reciprocating movements of the carriage 24 are accomplished by a hydraulic power device 30 connected at one end to bracket structure 31 (FIG. 10) and at the opposite end to a suitable bracket structure within the tilting frame 5. This hydraulic power device 30 may be of the usual telescopic cylinder and piston-type capable of expanding movements for reciprocating the carriage lengthwise of the tilting frame upon operation of the hydraulic power device.

Mounted on the carriage 24 is a bail, generally indicated at 32. The bail 32 comprises a closed or loop section 33 at the rearward end thereof and side members 34. As shown in FIGS. 8 and 9, each of the side members 34 is in the form of a box section as, for example, by overlapping a pair of angle bars and welding these together. The box section is notched out at the rear end thereof, as indicated at 35 in FIG. 8, to receive the forward end of the loop section 33 which fits into this notched portion, and is welded thereto.

The bail side members 34 extend forwardly of the carriage 24 between the side rails 25 thereof and are supported at their forward ends on a pivot rod 36 which extends between the side rails 25. As shown in FIG. 12, the end portions of the bail side members 34 are mounted on a spacer sleeve 37 which is interposed between side rails 25, and between bushings 38 mounted in the box-like side rails 25 of the carriage 24. The pivot rod 36 extends into the bushings 38 where it is anchored by a pin 39 at one or both opposite ends thereof, as shown in FIG. 12. The pin 39 can be inserted and removed through an opening 40 in the top face of the box-like side rail 25. This permits the bail member 32 to swing vertically relative to the carriage 24 about the axis of the pivot rod 36.

The bail side members 34 are spaced apart intermediate their lengths by a spacer bar 41 (see FIGS. 10 and 11). Interconnecting the spacer bar 41 and the bearing sleeve 37 is a plate 42. A leaf spring assembly is illustrated at 43 extending lengthwise of the bail 32, secured at one end to the spacer bar 41. The lowermost leaf of the leaf spring assembly 43 has a bearing eye 44 which bears upon a bridging plate 45 extending between the side rails 25 of the carriage 24. Thus, the leaf spring 43 is in the nature of a cantilever spring and, by rocking and sliding motion with respect to the bridging plate 45, imparts a tendency to the intermediate portion of the bail 32, tending to hold the bail in its elevated position relative to the carriage 24, as illustrated in dotted lines in FIG. 11.

The detachable body or container is illustrated generally in FIG. 1 by the numeral 46. This body or container may be of any suitable size and type as desired and of any desired height. For example, it may be of the conventional dump body size with an open top, or provided with an enclosed top and of greater capacity, according to the character of the material that is to be received and transported therein.

Figure 5:
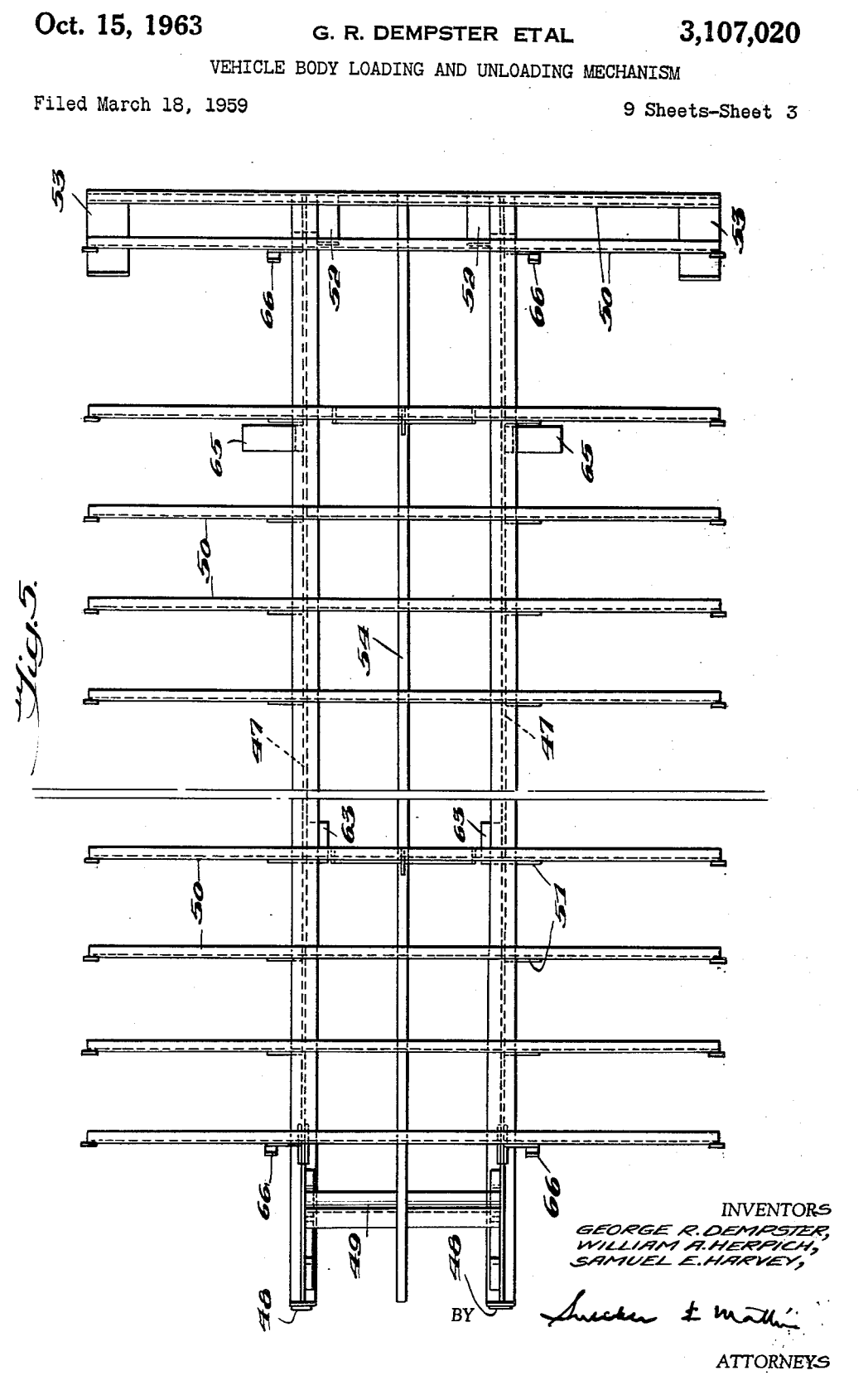

We have shown in FIGS. 3, 5, 6 and 7 only the subframe for the container for simplicity of illustration and also to indicate that a manufacturer may build, if desired, only the subframe which can be supplied to the user. The latter, in turn, can provide any desired form and size of detachable body or container, according to the needs and requirements for the equipment. This would save materially in transportation costs.

The subframe includes a pair of longitudinal beams, generally indicated at 47, which form runners for supporting the body upon the top surfaces of the tilting frame side members 6 between the side plates 8 thereof (FIG. 3). At their forward ends, the beams 47 are curved upward in the form of bows 48 to facilitate the guiding of the container into its seated position on the tilting frame. The beams 47 are held spaced apart at suitable intervals by cross braces 49 and are rigidly braced, as desired.

Extending transversely over the longitudinal beams 47, which form the runners for the body, are cross ribs 50. The spacing of the ribs 50 may be varied, according to the character of the lading to be supported, and the length of these ribs transversely of the body or container should be in proportion to the width of the latter, extending to the side walls thereof. The ribs 50 are welded or otherwise secured rigidly to the upper faces of the beams or runners 47 and are also provided with diagonal braces, generally indicated at 51, which stabilize the connection of the beams therewith.

At the rear ends of the longitudinal beams or runners 47 are secured sled runner sections 52 of arcuate shape. Mounted on the outer ends of the rearmost cross ribs 50 are sled runner sections 53 substantially semi-circular in shape and corresponding with the curvature of the sled runner sections 52. These sections 52 and 53 serve as skids or supports for holding the rear end portion of the body, bearing upon the ground, floor or other supporting surface, as the body is moved onto or off the tilting frame of the vehicle.

Extending lengthwise of the subframe intermediate the beams or runners 47 is a hook bar 54 which extends preferably throughout the length of the subframe. This hook bar 54 is secured in any suitable manner to the cross ribs 50 and to the intermediate bracing between the runners.

The hook bar 54 is provided with a plurality of hook stations 55 spaced along the length thereof for engagement of the bar 32 therewith in moving the container or detachable body onto or off the tilting frame. Usually three such hook stations may be sufficient, although the number and spacing thereof will depend upon the length of the body and the length of travel of each stroke of the bail 32.

Each of the hook stations 55 is formed with a pair of opposed hook surfaces 56 opening downwardly and with the lips of the hooks indicated at 57 in positions to be overlapped alternately by a shuttle 58. The shuttle 58 is pivoted at 59 on the hook bar 54 for swinging movement, normally hanging down by gravity in the position shown in FIG. 6, but free to swing over the respective hook lips 57 in diverting the curved portion 33 of the bail 32 out of the hook, when so desired, under the control of the operator.

The hook station at the forward end of the bar 54 is indicated at 55' and is shown more in detail in FIG. 15. In this form, one side of the hook station 55' is formed, as described above, whereas the hook portion 56' at the forward side of the hook station 55' is spaced sufficiently far away from the end of the shuttle 58 that the shuttle will not close over the lip 57' of the hook 56'. This insures that the bail 32 will engage with the hook portion 56' and thereby prevent the accidental total disconnection of the container from the tilting frame until that is desired by the operator.

The forward end portion of the hook bar 54 is turned upward, as indicated generally at 60. This portion 60 may also be provided with a hook portion 61, if desired, for initial connection of the bail with the container in pulling it into position. Such additional hook connection may not be necessary, especially when using the form of front hook station as shown in FIG. 15, where the hook portion 56' could also serve this purpose.

The tilting frame 5 is provided with longitudinally extending locking fingers 62 just inwardly of the side rails 8 of the tilting frame, as shown in FIG. 2. These locking fingers 62 are in position to engage over locking plates 63 secured to the bottom portions of the subframe when the container is in its forward carrying position thereon.

The rear end portions of the tilting frame 5 are also provided with locking fingers 64 laterally outside the side rails of the tilting frame 5 in positions for engaging locking plates 65.

The container subframe may be provided, if desired, with an arrester device such, for example, as that illustrated in FIGS. 16 to 18, to prevent the container from slipping backward during forward stroke of the bail. We have provided for this purpose a catch bar 66, preferably U-shaped, as shown, and located at the rear end of each hook station. The catch bar 66 is secured to one of the cross ribs 50 of the subframe and is in position to engage a cantilever-type arrester spring, generally indicated at 67. The arrester spring 67 preferably has multileaves for desired stiffness and supporting action, and with a raised hump portion 68 on the free end thereof in position to engage the catch spring 66.

The opposite end of the arrester spring 67 is pivotally supported by means of a bearing head 69 journaled on a shaft 70 projecting laterally outwardly from the adjacent tilting frame side member. A pin 71 detachably holds the head 69 on the shaft 70.

A quadrant plate 72 is also mounted on the adjacent tilting frame side member, with notches 73 in the lateral edge of said quadrant bar of a size and position to receive therein the adjacent portion of the head 69 mounting the spring 67. Thus, upon removal of the pin 71, the head may be moved axially of the shaft 70 to disengage the head from one of the notches 73 and thereby permit swinging of the spring 67 to another angular position as, for example, in its downward or inoperative position. It is then locked in that position upon reengagement of the pin 71.

*Operation*

The container or separable body 46 may be filled, if desired, separate and apart from the vehicle chassis, sitting on the ground or other supporting surface. The structure here involved may be used for picking up the container, loading it on the chassis and transporting it to a remote point where it can be removed again from the chassis or the contents discharged, as the case may be. This enables the one truck chassis to service a multiplicity of containers and yet it is possible for the containers to be of large size and capacity, comparable to the size and capacity of a vehicle body. Any suitable or desired lading can be handled therein that may be transported in a vehicle body or container.

In picking up or loading the separable body or container 46, the vehicle is backed up to the front end portion of the body with the latter sitting on the ground or other supporting surface, so that the back of the vehicle is at or in close proximity to the front end of the separable body or container. Then, upon operation of the power devices or cylinders 18, the tilting frame 5 can be moved to an upwardly inclined position about its pivot shaft 10, substantially to the dotted line position shown in FIG. 2. In the event that the stabilizing jack is used, the cylinder 13 is actuated to swing the roller 12 into engagement with the ground, which would aid in supporting the load on the tilting frame 5 during the pulling of the container or detachable body onto the vehicle.

With the tilting frame 5 in this position, the operator energizes the cylinder 30 to move the carriage 24 to the lower end of the inclined tilting frame 5. The bail 32 normally is in the raised position with respect to the carriage 24, as shown in full lines in FIG. 2 and in dotted lines in FIG. 11. The bail 32 will be projected below the lower end of the inclined tilting frame 5 and beneath the forward end portion of the separable body or container 46.

If the vehicle and container are properly aligned, the bail 32 will be centered under the upturned portion 60 of the hook bar 54. By the action of the cantilever springs 43, the bail 32 normally will be urged in an upward direction to an elevation sufficiently high so as to engage either in the hook 56' or in the hook 61. The angle of the tilting frame 5 may be varied under control of the operator by proper manipulation of the cylinders 18, so as to cause the bail 32 to engage either of these hooks, as desired.

Upon hook engagement with the container in this manner, the operator then would actuate the cylinder 30 to move the carriage 24 toward the front of the vehicle through a full stroke of the cylinder 30 or through a partial stroke, as desired by the operator. In the event that the detachable body or container is not properly aligned with the vehicle and the operator desires first to pull it into place by the handle mechanism, less than a full stroke may be required to do so. In that event, it will be sufficient to pull the container or detachable body only up to the tilting frame 5 and that may require less than a full stroke of the cylinder. Then the carriage 24 can be moved to the rear again by the operation of the cylinder 30 for causing the bail 32 to engage the hook 56'. Thereafter, upon reversing the movement of the carriage 24, the bail 32 will cause the front end portion of the container to be pulled up the inclined tilting frame 5, skidding along the surfaces of the side rails 6 between the guiding plates of the tilting frame. It will be apparent that the longitudinal beams or runners 47 will skid along the upper surfaces of the side rails 6 between the plates 8 as the container or detachable body is drawn up on the tilting frame.

The first stroke of the carriage 24 will be sufficient to engage the front end portion of the container or body with the tilting frame, causing it to rest on the tilting frame. The weight of the front end portion of the body or container resting thereon, and with the rear end portion resting on the supporting surface or ground, will be sufficient ordinarily to hold the container in place by friction and gravity, while the carriage 24 is moved through a second stroke. However, if it should be found desirable or necessary, suitable retainer means may be used to prevent the container or body from sliding back off the tilting frame in this position during the next stroke of the bail. Such retainer means is shown in FIGS. 16 to 22, wherein the leaf spring 67 engages the catch bars 66 at one or both opposite sides of the container, yieldably holding the container in place on the tilting frame.

Then, upon the next stroke of the carriage 24, the bail 32 will be moved to the next hook station 55, which hook stations are spaced apart along the length of the hook bar 54 substantially the corresponding distances of the stroke of the carriage. As the bail 32 moves along the under edge of the hook bar 54, it will enter the forward hook portion 56 ready for the next forward movement of the container or body upon operation of the cylinder 30 in the opposite direction. It will be apparent that the shuttle 58 will cause the bail loop 33 to be deflected over the hook 56 as it passes rearwardly, and yet permits the loop 33 of the bail to enter the hook facing in opposed relation thereto, ready for the forward movement of the container.

Thus, the container will be drawn forward on the tilting frame 5 step-by-step by successive strokes of the carriage 24 and of the bail 32, until the container is substantially entirely supported on the tilting frame. During this step-by-step operation, the tilting frame 5 will be lowered gradually by the power devices 18 until finally it is resting flat upon the chassis as shown by full lines in FIG. 2.

As the container or body moves substantially into its carrying position on the tilting frame, the locking plates 63 on the container will engage under the locking fingers 62 on the tilting frame 5 adjacent the forward portions thereof, as shown in FIGS. 23 and 24. Simultaneously therewith, the locking plates 65 will engage under the locking fingers 64 at the rear of the tilting frame, as shown in FIGS. 25 and 26. These parts will insure of anchoring the container securely in place on the tilting frame and chassis during transportation of the container.

In order to discharge the container or body from the vehicle chassis, this operation is reversed. The bail 32 can be moved rearwardly, first entering the rear hook of the rear hook station 55 and operating in a rearward direction for sliding the container or body rearward of the tilting frame 5. The operator will soon learn by experience how to manipulate the bail 32, so as to cause it to enter the proper one of the hooks at each successive hook station.

This reverse movement will continue step-by-step until the container has slid off the tilting frame. The initial projection of the container will cause its rear end to rest on the runners 52 and 53 on the ground or on other suitable support. For example, it can be set on a loading dock, railroad car or any platform that is no higher than the tilting frame in level position. The successive strokes will cause the container to be moved relative to the chassis step-by-step, either by positively pushing the container or by pulling away from the chassis, or in timed relation with the forward movement of the chassis with respect to the container. Again, the operator will learn by experience how to gauge these successive steps, so as to handle the container or body most expeditiously. The tilting frame 5 can be varied in its angle of tilting movement from horizontal to inclined, to facilitate the discharge of the container.

When the bail 32 reaches the last hook station 55' at the front of the container, the container will be resting with only the front end portion thereof bearing upon the tilting frame. It is desirable that the bail 32 should not be released entirely from the container until such time as it is so desired by the operator. Consequently, the shuttle 58 of the hook station 55' does not close the hook 56', but passes into the left-hand dotted line position shown in FIG. 15 and thereby insures that the bail will enter the hook 56' at the front of the container upon manipulation of the cylinder 32, thereby preventing the possibility that the front end portion of the container would slide off the tilting frame 5. However, when the container is sitting on the ground, the bail can be disengaged from the hook 56' by a further upward tilting movement of the tilting frame and thereby releasing the container from the mechanism.

It will be apparent that the loading, as well as unloading, action occurs automatically under control of the operator in the cab of the truck. It is not necessary that there be a man on the ground for attachment or detachment of the container with the truck, as has been required heretofore with cable type units. The automatic operation, under control of one operator, effects a substantial improvement in facilitating the loading and unloading operations.

While the invention has been illustrated and described in certain embodiments, it is recognized that other variations and changes may be made therein, without departing from the invention as set forth in the claims.

We claim:

1. In vehicle body loading and unloading mechanism of the character described, the combination of a tilting frame adapted to extend lengthwise of a motor vehicle, supporting means for the tilting frame mounting the frame for swinging movement in an upward direction, a carriage extending lengthwise of the tilting frame and including side rail members, runner means connected with the side rail members and mounted in guided relation with the tilting frame for supporting the carriage thereon for movement relative thereto, power means connected with the carriage for reciprocating the carriage relative to the tilting frame, a bail member having side portions and a loop connection therebetween adapted for connection with a body or container to move the latter onto or off the tilting frame, a shaft extending transversely between the side members of the carriage and pivotally mounting the sides of the bail member thereon, and a leaf spring connected at one end with the bail member and at the opposite end with the carriage normally tending to hold the bail member yieldably in a raised position with respect to the carriage and tilting frame.

2. In vehicle body loading and unloading mechanism of the character described, the combination of a tilting frame adapted to extend lengthwise of a motor vehicle, supporting means for the tilting frame mounting the frame for swinging movement in an upward direction, a carriage extending lengthwise of the tilting frame, runner means connected with the carriage and mounted in guided relation with the tilting frame for supporting the carriage thereon for movement relative thereto, power means connected with the carriage for reciprocating the carriage relative to the tilting frame, said carriage including side rails spaced apart, a shaft extending transversely between the side rails, means detachably mounting the shaft in the side rails, a sleeve surrounding the shaft and journaled thereon, and a container connecting member mounted on the sleeve for raising and lowering movements relative to the carriage.

3. In vehicle body loading and unloading mechanism of the character described, the combination of a tilting frame adapted to extend lengthwise of a motor vehicle, supporting means for the tilting frame mounting the frame for swinging movement in an upward direction, a carriage extending lengthwise of the tilting frame and including side rail members, runner means connected with the side rail members and mounted in guided relation with the tilting frame for supporting the carriage thereon for movement relative thereto, power means connected with the carriage for reciprocating the carriage relative to the tilting frame, said carriage including side rails spaced apart, a shaft extending transversely between the side rails, means detachably mounting the shaft in the side rails, a sleeve surrounding the shaft and journaled thereon, and a container connecting member mounted on the sleeve for raising and lowering movements relative to the carriage, said container connecting member comprising a U-shaped bail having lateral sides thereof fixed to the sleeve at points spaced axially of said sleeve.

4. In vehicle body loading and unloading mechanism of the character described, the combination of a tilting frame adapted to be mounted on a vehicle chassis and to extend lengthwise thereof and swingable between a generally horizontal position and inclined positions, said tilting frame being adapted to receive a container thereon, means for moving the container lengthwise onto or off the tilting frame, and means including a spring mounted on the tilting frame to extend to a normal operative position in the path of a portion of the container for restricting inadvertent movement of a container with respect to the tilting frame and movable against the force of the spring to a position for allowing a container to be moved with respect to the tilting frame either onto or off the tilting frame upon actuation of said moving means.

5. In vehicle body loading and unloading mechanism of the character described, the combination of a tilting frame adapted to be mounted on a vehicle chassis and to extend lengthwise thereof and swingable between a generally horizontal position and inclined positions, said tilting frame being adapted to receive a container thereon, means for moving the container lengthwise onto or off the tilting frame, and means including a leaf spring mounted on the tilting frame to extend to a normal operative position in the path of a portion of a container for restricting inadvertent movement of a container with respect to the tilting frame and movable against the force of the spring to a position for allowing a container to be moved with respect to the tilting frame either onto or off the tilting frame upon actuation of said moving means, said means being selectively adjustable to an inoperative position wherein said means cannot extend into the path of any portion of a container.

6. In vehicle body loading and unloading mechanism of the character described, the combination of a separate container, a tilting frame adapted to be mounted on a vehicle chassis and to extend lengthwise thereof and swingable between a generally horizontal position and inclined positions, said tilting frame being adapted to receive the container thereon, means for moving the container lengthwise onto or off the tilting frame, a series of catch means fixed to and spaced-apart along the container, means including a spring mounted on the tilting frame to extend to a normal operative position in the path of the catch means on the container to engage the catch means for restricting inadvertent movement of the container with respect to the tilting frame and movable against the force of the spring to an inoperative position for allowing the container to be moved with respect to the tilting frame either onto or off the tilting frame upon actuation of said moving means.

7. In vehicle body loading and unloading mechanism of the character described, the combination of a separate container, a tilting frame adapted to be mounted on a vehicle chassis and to extend lengthwise thereof and swingable between a generally horizontal position and inclined positions, said tilting frame being adapted to receive the container thereon, means for moving the container lengthwise onto or off the tilting frame, a series of catch means fixed to and spaced-apart along both sides of the container, a pair of detent means each including a leaf spring mounted on opposite sides of the rear of the tilting frame to extend to a normal operative position in the path of the catch means on the container to engage the catch means for restricting inadvertent movement of the container with respect to the tilting frame and movable against the force of the spring to an inoperative position for allowing the container to be moved with respect to the tilting frame either onto or off the tilting frame upon actuation of said moving means.

8. In vehicle body loading and unloading mechanism of the character described, the combination of a tilting frame adapted to extend lengthwise of a motor vehicle, supporting means for the tilting frame mounting the frame for swinging movement in vertical directions, a carriage extending lengthwise of the tilting frame and including side rail members, a pair of support means on each side of the side rail members spaced-apart longitudinal thereof and mounted in guided relation with the tilting frame for supporting the carriage thereon for movement along the tilting frame toward the front and rear thereof, a shaft mounted directly on and extending between the side rail members of the carriage at a point between the support means, a bail member extending rearwardly of the carriage having side portions connected at their rearward ends by a loop portion extending transversely with respect to the carriage and adapted for connection with a body or container to move the latter onto or off the tilting frame, the forward ends of the side portions mounted on the shaft for pivotal movement of the bail member in vertical directions, and power means between the tilting frame and the carriage connected to the side rail members independently of the shaft and at a point forwardly thereof for reciprocating the carriage along the tilting frame.

References Cited in the file of this patent

UNITED STATES PATENTS

| | | |
|---|---|---|
| 1,303,854 | Clark | May 20, 1919 |
| 1,509,876 | Rasnick et al. | Sept. 30, 1924 |
| 1,615,532 | Baxter | Jan. 25, 1927 |
| 2,101,871 | Pease | Dec. 14, 1937 |
| 2,534,156 | Wyatt et al. | Dec. 12, 1950 |
| 2,623,759 | Forbas | Dec. 30, 1952 |
| 2,670,866 | Gleasby | Mar. 2, 1954 |
| 2,745,566 | Bouffard | May 15, 1956 |
| 2,786,590 | Edwards et al. | Mar. 26, 1957 |
| 2,789,715 | Filipoff et al. | Apr. 23, 1957 |
| 2,849,130 | Van Der Velde | Aug. 26, 1958 |
| 2,867,339 | Nelson | Jan. 6, 1959 |
| 2,889,944 | Clark et al. | June 9, 1959 |
| 2,963,185 | Jones et al. | Dec. 6, 1960 |